United States Patent
White (10) Patent No.: US 7,480,860 B2
(45) Date of Patent: Jan. 20, 2009

(54) DATA DOCUMENT GENERATOR TO GENERATE MULTIPLE DOCUMENTS FROM A COMMON DOCUMENT USING MULTIPLE TRANSFORMS

(75) Inventor: David J. White, Austin, TX (US)

(73) Assignee: Versata Computer Industry Solutions, Inc., Austin, TX (US)

( * ) Notice: Subject to any disclaimer, the term of this patent is extended or adjusted under 35 U.S.C. 154(b) by 1121 days.

(21) Appl. No.: 09/840,737

(22) Filed: Apr. 23, 2001

(65) Prior Publication Data
US 2003/0014447 A1 Jan. 16, 2003

(51) Int. Cl.
*G06F 17/24* (2006.01)
*G06F 15/16* (2006.01)

(52) U.S. Cl. .................. 715/255; 715/234; 715/243; 709/203; 707/104.1

(58) Field of Classification Search .......... 707/523, 707/104.1, 5, 102, 100, 203, E17.012; 715/523, 715/518, 501.1, 511, 517, 522, 530, 200, 715/204, 234, 236, 238, 243, 249, 273, 274, 715/760, FOR. 255, FOR. 260; 709/201, 709/203, 212, 213, 216, 217
See application file for complete search history.

(56) References Cited

U.S. PATENT DOCUMENTS

| 5,299,304 | A | * | 3/1994 | Williams et al. | .......... 715/523 |
|---|---|---|---|---|---|
| 5,369,732 | A | | 11/1994 | Lynch et al. | .......... 395/51 |
| 5,515,524 | A | | 5/1996 | Lynch et al. | .......... 395/500 |
| 5,708,798 | A | | 1/1998 | Lynch et al. | .......... 395/500 |
| 5,825,651 | A | | 10/1998 | Gupta et al. | .......... 364/468.09 |
| 5,842,223 | A | | 11/1998 | Bristor | |
| 5,878,400 | A | | 3/1999 | Carter, III | .......... 705/20 |
| 5,893,109 | A | * | 4/1999 | DeRose et al. | .......... 707/104.1 |
| 5,928,323 | A | | 7/1999 | Gosling et al. | .......... 709/203 |
| 6,002,854 | A | | 12/1999 | Lynch et al. | .......... 395/500.01 |
| 6,009,436 | A | * | 12/1999 | Motoyama et al. | .......... 707/102 |

(Continued)

OTHER PUBLICATIONS

Richard Han, WebSplitter: a unified XML framework for multi-device collaborative Web browsing, ACM Press, 2000, pp. 221-230.*

(Continued)

*Primary Examiner*—Doug Hutton
*Assistant Examiner*—Maikhanh Nguyen
(74) *Attorney, Agent, or Firm*—Hamilton & Terrile, LLP; Kent B. Chambers (57) ABSTRACT

A data management system for generating customized versions of data documents. Initially the document is stored as in the form of raw data, which is subsequently parsed into an internal representation of the document. In one embodiment, raw data is stored in XML form and is parsed by an XML parser. Upon the initial request for a customized version of the document, a sequence of transforms is applied to the internal representation and to subsequently transformed documents in order to create hierarchical, customized document levels. In one embodiment, transforms are implemented as either XSL stylesheets, although Java classes may also be employed. The document versions are written to cache, and subsequent requests for existing versions of the document are referred to cache. In the event that any document dependencies change, a cached version will be denoted invalid, and subsequent requests will result in the re-generation of a customized version.

62 Claims, 4 Drawing Sheets

U.S. PATENT DOCUMENTS

| | | | |
|---|---|---|---|
| 6,052,681 | A | 4/2000 | Harvey |
| 6,119,125 | A | 9/2000 | Gloudeman et al. |
| 6,145,120 | A | 11/2000 | Highland |
| 6,157,922 | A | 12/2000 | Vaughan ...................... 706/46 |
| 6,314,460 | B1 | 11/2001 | Knight et al. |
| 6,356,920 | B1 | 3/2002 | Vandersluis .............. 715/501.1 |
| 6,405,308 | B1 | 6/2002 | Gupta et al. .................... 713/1 |
| 6,446,057 | B1 | 9/2002 | Vaughan ...................... 706/46 |
| 6,473,898 | B1 | 10/2002 | Waugh et al. |
| 6,535,896 | B2 | 3/2003 | Britton et al. ............... 715/523 |
| 6,553,350 | B2 | 4/2003 | Carter, III ..................... 705/20 |
| 6,629,153 | B1 | 9/2003 | Gupta et al. ................. 709/316 |
| 6,643,703 | B1 | 11/2003 | Armistead et al. .......... 709/238 |
| 6,662,164 | B1 | 12/2003 | Koppelman et al. ........... 705/14 |
| 6,772,395 | B1 | 8/2004 | Hyman et al. ............... 715/513 |
| 6,772,413 | B2* | 8/2004 | Kuznetsov .................. 717/136 |
| 6,865,524 | B1 | 3/2005 | Shah et al. .................... 703/13 |
| 6,865,714 | B1* | 3/2005 | Liu et al. ..................... 715/523 |
| 6,938,203 | B1* | 8/2005 | Dimarco et al. ............. 715/513 |
| 6,941,511 | B1* | 9/2005 | Hind et al. .................. 715/523 |
| 6,963,847 | B1 | 11/2005 | Kennedy et al. ............... 705/8 |
| 7,055,094 | B2* | 5/2006 | Imielinski et al. ........... 715/517 |
| 2002/0013792 | A1* | 1/2002 | Imielinski et al. ........... 707/523 |
| 2002/0062325 | A1* | 5/2002 | Berger et al. ................ 707/518 |
| 2002/0123993 | A1* | 9/2002 | Chau et al. ...................... 707/5 |
| 2003/0014414 | A1* | 1/2003 | Newman ..................... 707/10 |
| 2005/0055420 | A1* | 3/2005 | Wyler .......................... 709/217 |

OTHER PUBLICATIONS

Candan et al., "Enabling Dynamic Content Caching for Database-Driven Web Sites," ACM, 2001, pp. 532-543.*

Norman Walsh, XSL The Extensible Style Language [online], Web Techniques, Jan. 1999 http://www.webtechniques.com/archives/1990/01/walsh/, retrieved Aug. 9, 2005.

Selena Sol, What is a Markup Language [online], Web Developer's Virtual Library, Mar. 8, 1999, http://www.wdvl.internet.com/Authoring/Languages/XML/Tutorials/Intro/what_is_markup_language, retrieved Sep. 21, 2005.

Selena, Sol, What is XML [online], Web Developer's Virtual Library, Mar. 8, 1999, http://wdvl.internet.com/Authoring/Languages/XML/Tutorials/Intro/what_is_xml.html, retrieved Sep. 16, 2005.

Selena Sol, The Well-Formed Document [online], Web Developer's Virtual Library, Mar. 9, 1999, http://wdvl.internet.com/Authoring/Languages/XML/Tutorials/Intro/well_iformed_doc.html, retrieved Aug. 10, 2005.

U.S. Appl. No. 09/163,752, filed Sep. 30, 1998, Waugh et al.
U.S. Appl. No. 09/413,963, filed Oct. 7, 1999, Lynch et al.
U.S. Appl. No. 09/809,991, filed Mar. 15, 2001, Chao et al.
U.S. Appl. No. 09/810,012, filed Mar. 15, 2001, Chao et al.
U.S. Appl. No. 09/810,515, filed Mar. 15, 2001, Zhou et al.
U.S. Appl. No. 09/810,519, filed Mar. 13, 2001, Zhou et al.
U.S. Appl. No. 09/896,140, filed Jun. 29, 2001, Gharavy.
U.S. Appl. No. 09/896,144, filed Jun. 29, 2001, Gharavy.

Selena Sol, Introducing the Valid XML Document and the DTD [online], Web Developer's Virtual Library, May 3, 1999, http://wdvl.internet.com/Authoring/Languages/XML/Tutorials/Intro/dtd_intro.html, retrieved Aug. 10, 2005.

XSLT, Xpath and XSL Formatting Objects [online], Web Developer's Virtual Library, http://wdvl.internet.com/Authoring/Languages/XSL, retrieved Aug. 10, 2005.

Adam Rifkin, A Look at XML [online], http://www.webdeveloper.com/xml/xml_a_look_at_xml.html, retrieved Aug. 10, 2005.

A Flexible Commission System to Improve Your Agency Relationships, CSC: Financial Services—S3+ Contract and Commissions [online], http://www.csc-fs.com/MARKETS/detail/pc_s3_contracts.asp, retrieved Sep. 16, 2005.

PolicyLink Commission System, CSC: Financial Services [online], http://www.csc-fs.com/MARKETS/detail/la_policylinkcomm.asp, retrieved Sep. 16, 2005.

Pictorial, Inc.—Insurance and Financial Services Training [online], http://www.pictorial.com Retrieved Aug. 16, 2001.

What is AppointPak? [online], http://www.bisys-licensing.com/apptpak/whatis.htm, retrieved Aug. 16, 2001.

AppointPak Features and Benefits [online], http://www.bisys-licensing.com/apptpak/features/htm, Retrieved Sep. 16, 2005.

What is e-PAL? [online], http://www.bisys-licensing.com/palvt/whatis.htm, retrieved Sep. 16, 2005.

e-PAL Features & Benefits [online], http://www.bisys-licensing.com/palvt/features.htm, retrieved Sep. 16, 2005.

Nine e-PAL Services, Features and Benefits [online], http://www.bisys-licensing.com/palvt/serv.html, retrieved Sep. 21, 2005.

HRMS Enterprise Applications, Human Resources Management, PeopleSoft, Inc. [online], http://www.peoplesoft.com/en/us/products/applications/hrm/HRMS/hrmsea/index.html, retrieved Sep. 16, 2005.

HRMS Collaborative Applications, Human Resources Management, PeopleSoft, Inc. [online], http://www.peoplesoft.com/en/us/products/applications/hrm/HRMS/hrmsca/index.html, retrieved Sep. 16, 2005.

Financial Planning Made Easy, American Express Financial Services [online], http://finance.americanexpress.com/sif/cda/page/0,1641,4588,00.asp, retrieved Sep. 16, 2005.

Advice and Planning, American Express Financial Services [online], http://finance.americanexpress.com/sif/cda/page/0,1647,7569,00.asp, retrieved Sep. 16, 2005.

Why ContractMaker, And How Does it Work?, Legal Contracts, Digital Contracts, Inc., [online], http://www.digicontracts.com/info/whyhow.html, retrieved Aug. 10, 2005.

Frequently Asked Questions, Digital Contracts, Inc., [online], http://www.digicontracts.com/kits/faqs.html, retrieved Aug. 10, 2005.

K. Walrath, M. Compione, "The JFC Swing Tutorial: A Guide to Construction GUI's," ISBN #0201433214, Book & CD Rom, Jul. 1999.

"The JFC Swing Tutorial," http://java.sun.com/docs/books/tutorial/uiswing/TOC.html#start Sun Microsystems, Inc. 1995-2002.

"The Java Tutorial: User Interfaces that Swing: A Quick Start: Layout Management," http://java.sun.com/docs/books/tutorial/uiswing/mini/layout.html, Sun Microsystems, Inc. 1995-2002.

"The Java Tutorial: Swing Features and Concepts: Layout Management," http://java.sun.com/docs/books/tutorial/uiswing/overview/layout.html, Sun Microsystems, Inc. 1995-2002.

"The Java Tutorial: Creating a GUI with JFC/Swing Lesson, Laying Out Components within a Container," http://java.sun.com/docs/books/tutorial/uiswing/layout/index.html, Sun Microsystems, Inc. 1995-2002.

G. Shepherd, S. Wingo, "MFC and Monikers," http://www.devx.com/premier/mgznarch/vcdj/1997/dec97/moniker1.asp, Dec. 1997.

"MSDN: Internet Development Index, URL Monitors Tutorial," http://msdn.microsoft.com/workshop/networking/moniker/moniker/asp.?frame=true, Microsoft Corporation, 2002.

"MSDN: URL Monikers: Overview," http://msdn.microsoft.com/workshop/networking/moniker/overview/overview.asp., Microsoft Corporation, 2002.

The COM Specification: Persistent Intelligent Names: Monikers, Chapter 11. Monikers, http://medg.lcs.mit.edu/ftp/emjordan/com/ch11%2mon.doc, Microsoft Corporation, 1995, pp. 1-31.

R. Cover, "The XML Cover Pages, XML Schemas," Feb. 19, 2002, http://www.oasis-open.org/cover/schemas.html, pp. 1-79.

J. Clark, "W3C XSL Transformations (XSLT) Version 1.0," W3C Recommendation 16, Nov. 1999, http://www.w3.org/TR/1999/REC-sxlt-10001116, copyright 1999 W3c, pp. 1-110.

J. Clark et al., Extensible Stylesheet Language (XSL), Professional XML, Wrox Press, Michael Kay. XLST Programmer's Reference, World Wide Consortium, 1998 Version 1.0, http://www.w3.org/TR/1998/WD-xsl-19981216.

* cited by examiner

DATA DOCUMENT GENERATOR TO GENERATE MULTIPLE DOCUMENTS FROM A COMMON DOCUMENT USING MULTIPLE TRANSFORMS

BACKGROUND OF THE INVENTION

1. Field of the Invention

The invention relates to techniques for data collection, management, and generation and, more particularly, to a system for efficiently generating customized data documents, including but not limited to the generation of data documents by sequential decomposition in accordance with a demand-driven methodology.

2. Description of the Related Art

Distributors and purchasers of various kinds of products, including computers and computer peripherals, must address a compelling need to distribute and/or acquire data, usually in the form of data sheets or similar documents, that characterize, and thereby inform acquisitions of, the respective products. Preparation and publication of comprehensive and reliable data sheets is a daunting task. In fact, third parties have realized that profitable enterprises may be based on the collection, arrangement and distribution of information regarding various products or services, including those distributed by themselves, as well as by others.

In this regard, U.S. patent application Ser. No. 09/350, 270, entitled *System and Method for Data Compilation*, filed Jul. 6, 1999 and assigned to the assignee of this application (hereby incorporated by this reference in its entirety for all purposes), is directed to a system and method for compiling data that defines components to be configured into a personal computer system. With respect to such components, a predetermined array of attributes is established to characterize particular components. In accordance with that system, at least two operators, or agents, independently acquire values for the attributes from a global source of relevant data, which may reside on the World Wide Web (Web). In one embodiment, the agents are provided with a finite set of predetermined values, or ranges of values, that is deemed to include a value that is accurate for the attribute under consideration. The agents then respectively select values for the attribute. The selection is based on the acquired values and is evaluated with respect to the predetermined values. The respective values are error checked and then compared for equality. If the values selected by the agents are equal, a value for the attribute is written into an attribute database. If the values are not equal, the discrepancy is resolved empirically. A compilation of data defining the component is then extracted from the attribute database. In order to enhance accuracy, the global source of relevant data is regularly analyzed in order to, for example, identify updated attribute values. The above-identified patent application is hereby incorporated, in entirety and for all purposes, by reference into this patent application.

The system described above enables an efficient, comprehensive and accurate Compilation of raw data that characterizes, for example, components of a personal computer system. However, as may be expected, users of such data documents often have idiosyncratic requirements of preferences regarding the content and method of delivery of the data documents. For example, clients of data documents can be expected to have disparate needs for technical specifications, marketing text, performance reviews and the like. In addition, enterprises that distribute data documents for consideration understandably desire to control the information that is made available to their clients in order that the enterprise may correlate the payment made for data documents to the value of the information received by the client.

Historically, responding to the demand for personalized versions of data documents has necessitated the development of customized software code to transform a baseline document into the form requested by a client. It may be readily appreciated that such an approach is ponderous as well as expensive. In addition, the generation of numerous iterations of the same baseline document is susceptible to the creation and propagation of error.

Accordingly, what is desired is a data management and generation system that enables rapid, efficient, reliable and cost-effective generation of customized data documents. The system should provide the data proprietor with substantial control of the manner in which customized data documents are created and distributed. In addition, the system should minimize both the amount of software that must be developed in order to create customized documents, as well as the amount of computer processing that is required to satisfy client requests.

SUMMARY OF THE INVENTION

The above and other objects, advantages and capabilities are achieved in one aspect of the invention by a document-generation process that is performed as follows:

(a) a raw document is parsed to create and internal representation of the document;

(b) a first-level transform is read from a database in which a set of transforms are stored;

(c) the first-level transform is applied to the internal representation of the raw document so as to create a first-level document;

(d) the first-level document is written to cache (or to an equivalent storage medium);

(e) when a request is received for a second-level document that is based on, or is derived or depends from, the first-level document, a second-level transform is applied to the first-level document so as to create a second-level document; and (f) the second-level document is written to cache.

In a routine extension of the aspect of the invention, additional document levels may be implemented, each document level resulting from the application of a (customized) transform to an immediately preceding level document. Respective documents are stored and may be distributed, or otherwise made available, to clients in any one or more of a number of modes, such as online access, downloading to resident processors, multicasting or mass distribution.

In a further aspect of the invention, the invention is manifested as a method of generating customized versions of documents. In accord with one aspect of this embodiment, a document is stored in a primitive form and is then parsed so as to create and internal representation of the document. The internal representation is decomposed in a manner that enables one or more levels of customized versions of the document. In a particular instance, decomposition comprises applying sequential transforms to the internal representation and, if requested, to intermediate-level documents.

Another aspect of the invention is embodied in a data document that is generated by storing a raw form of the document and then parsing the document to create an internal representation. The document is subsequently decomposed by sequential transformations into a form requested by a recipient of the document. If the document is stored in XML form, then it may be parsed by XML parser objects into the internal representation. Furthermore, customized versions of the document are created by sequentially applying transforms, in the form, for example, of XSL stylesheets, to intermediate versions of the document.

In yet another aspect, the invention is embodied in a system for generating customized documents. The system comprises a primary database that included a document table and a transform table. Both a raw-data database and a transform database are accessible to the primary database. A cache is coupled the the primary database and stores customized versions of documents.

In further aspect, a primitive form of data document is parsed into an internal representation of the document. As a non-limiting example, the new document may be internally represented in XML form. The internal representation is transformed into at least one subscription-level document, which, in turn, is transformed into a DEFAULT organization-level document and at least one user-specific organization-level document. The DEFAULT organization-level document is transformed into a first presentation-level document, and the user-specific organization-level document is similarly transformed into a second presentation-level document. In a specific embodiment, the presentation-level documents may be different, even though identical presentation level transforms are applied to the DEFAULT organization-level document and the user-specific organization-level document.

BRIEF DESCRIPTION OF THE DRAWINGS

The present invention may be better understood, and it's numerous objects, features and advantages made apparent to those skilled in the art with reference to accompanying Drawings, in which use of the same reference number throughout the figures of the Drawing designates the same or a similar element and in which.

Although the invention is susceptible to various modifications and may be exploited in alternative forms, specific embodiments of the invention are shown by way of example in the Drawings and will herein be described in detail. It should be understood, however, that the Drawings and the detailed Description are not intended to limit the invention to the particular form disclosed, but, conversely, the intention is to embrace all modifications, equivalents, and alternatives falling within the spirit and scope of the present invention, as defined by the appended Claims.

DESCRIPTION OF AN EMBODIMENT OF THE INVENTION

For a thorough understanding of the subject invention, reference is made to the following Description, including the appended Claims, in connection with the above-described Drawings.

In a manner that will be reveled in detail, in one embodiment the invention may be realized as a data management system for generating customized versions of data documents. Initially, a data document is store as in the form of raw data, which is subsequently parsed into an internal representation of the document. For example, raw data may be stored in XML form and parsed by and XML parser. Upon the initial request for a customized version of the document, a sequence of transforms is applied to the internal representation and to subsequently transformed documents in order to create hierarchical, customized document levels. Transforms may be implemented as XSL stylesheets, although Java classes may also be employed. The document versions are written to cache, and subsequent requests for existing versions of the document are referred to cache. In the event that any document dependencies change, a cached version will be noted invalid, and subsequent request of the document will result in the re-generation of a customized version. The data management system may be implemented in the form of a document manager, a database that includes a document table and a transform table. The document manager reads raw documents from a raw-document database and reads transforms from a transform database. Requested customized documents are written to cache. As contemplated herein, the data management and document generation system enables rapid, efficient, reliable and cost-effective generation of customized data documents. The system provide the data proprietor with substantial control of the manner in which customized data documents are created and distributed. In addition, the system minimizes both the amount of software that must be developed in order to create customized documents, as well as the amount of computer processing that is required to satisfy client requests.

In a manner that will be fully described below, in one embodiment the invention represents a methodology that supports demand-driven generation of multiple customized versions of data sets that are initially compiled as XML documents. That, is data documents that describe respective products, such as components of a personal computer system, are compiled. In one approach, data may be advantageously compiled in accordance with the methodology described in U.S. patent application Ser. No.: 09/350,270, supra. The raw data document may then be parsed by XML parser objects into and internal representation of the document.

Those skilled in the art appreciate XML to be a versatile mark-up language, and voluminous contemporary technical literature is available from which may be gleaned a working knowledge of the design and use of XML. See, for example, Michael Birbek, et al., *Professional XML,* Wrox Press Inc. (2000), hereby incorporated by reference.

The customization is performed through the application of XSL is a language for specifying stylesheets that may be applied to complex XML data and that enables presentation in HTML or other formats. XSL has the capacity to map a single EXM element into more than one type of display object. Specifically, XSL is able to map an XML element into more than one type of display object. For example, XSL is able to map an XML element to an element in a list as well as to an item in a table. For additional information regarding XSL, see Neil Bradley, *The XSL Companion,* Addison-Wesley Publication Co. (2000); see also *Extensible Stylesheet Language: XSL Version* 1.0, available from Excell Inc., both hereby incorporated by reference.

The document-generation process is demand-driven in the sense that although all, or substantially all, the raw data documents that have been created by the enterprise may be stored and made available for customized transformation into subscription-level, organization-level, and presentation-level documents, none of the customized documents are generated until a demand has been asserted for the respective customized document.

The demand-driven nature of the process is especially relevant in light of potential requirement for a combinatorial number of generated documents, all derived from the initial XML documents. In addition, and in a manner that will be described below, the subject methodology includes dependency tracking to ensure that all generated documents are regenerated, or refreshed, when any dependencies change. For the purposes of the Description, a document "dependency" may be understood as any other document or transform on which the document in question is predicated. For example, if a document is formed by applying a transform to a parent document, then a change in the transform or a change in the parent document constitutes a change in the dependency of the document in question.

The initial demand for a customized document may result from a client request or may arise in a document publication process. The request will result in the generation of a transformed document that is then cached. Any subsequent requests for the specified document will return a reference to the cached version. In the event that any of the dependencies of the generated document change, then the cached version will be designated invalid, and any future requests for the document will result in the re-generation of the customized document, and earlier versions of the document will be noted as invalid. The invalid version of the document will not necessarily be deleted immediately at the time of regeneration, inasmuch as that document may then be in use.

The transformation of an initial document into a final document may be decomposed into a series of sequential transforms. Decomposition simplifies the creation, validation and maintenance of the transforms. In addition, decomposition disassociates enforcement of business-logic content filtering from end-user presentation. Each step in the decomposed transform is cached to avoid redundant regeneration of requested documents. The transform may be decomposed into any number of sequential transforms. As presently contemplated, one embodiment of the invention includes a datasheet manager that supports three levels of transforms. The supported transform levels are respectively designated: subscription, organization, and presentation.

Figure 1:
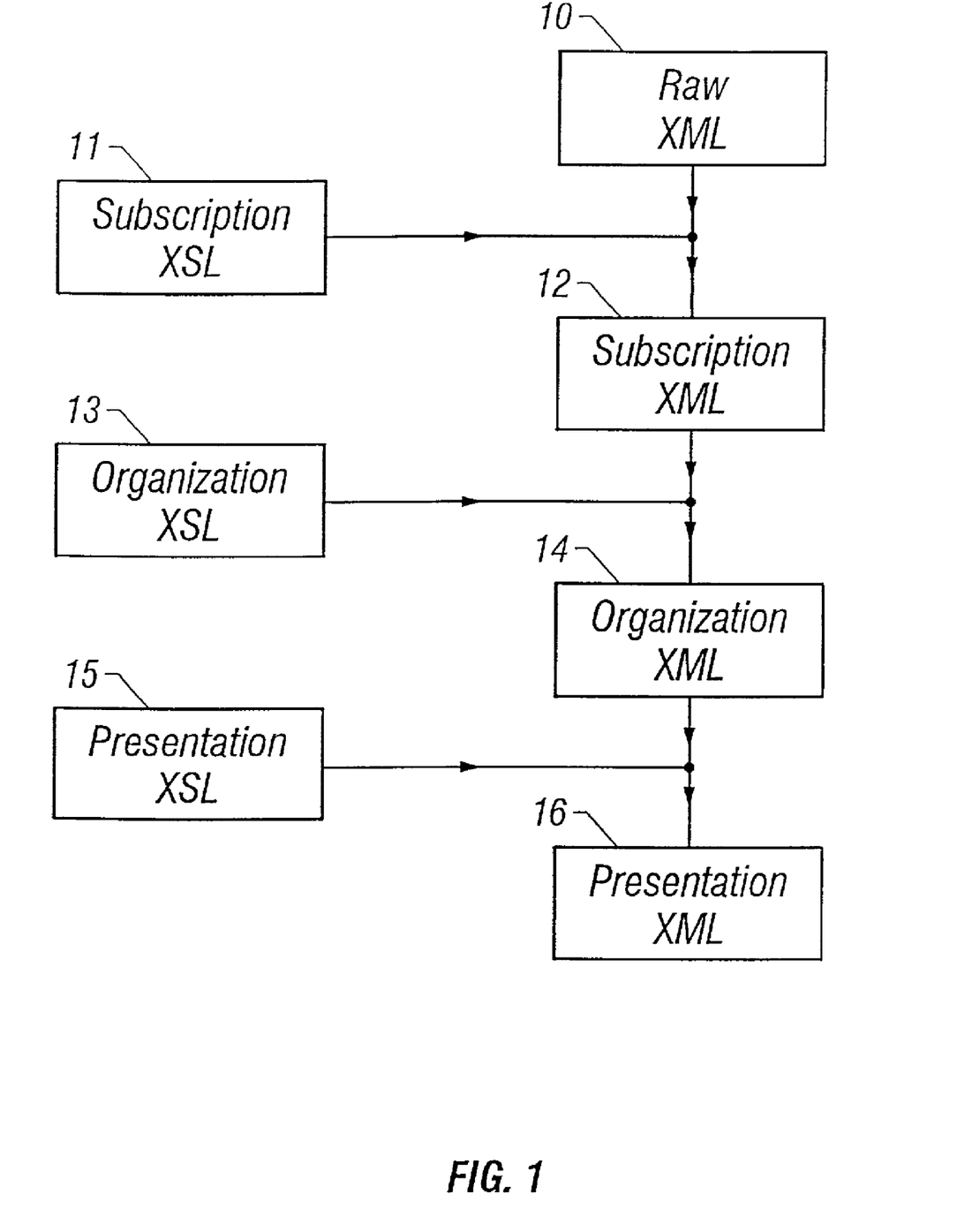
FIG. 1 is a generalized graphical representation of the process of transformation/decomposition methodology use to create customized documents.

A generalized graphical representation of the tranformation/decomposition methodology used to create customized documents is depicted in FIG. 1. As may be seen from FIG. 1, a raw data document is parsed by XML parser objects and is stored as a internal representation 10 in XML form. A subscription-level transform 11 is applied to the internal representation 10 to generate a customize subscription-level document 12. Subsequently, and in response to a request for a customized organization-level document, an organzation-level transform 13 is applied to the subscription-level document 12 in order to generate a customized organization-level document 14. Similarly, in response to a request for a customized presentation-level document, a presentation-level transform 15 is applied to organization-level document 14, resulting in the creation of a customized presentation-level document 16. The transforms perform functions indentified immediately below and, in an examplary embodiment, are implemented in the form of XSL stylesheets.

Specifically, the subscription-level transform converts a raw document to a subscription-level document. This transform level enables content filtering to provide end users with the subset of the document content that they have purchased. A subscription-level transform is required, inasmuch as all other lower level transforms are derived, directly or indirectly, from a subscription-level transform.

The organization-level transform converts a subscription-level document into and organization-level document. The organization-level customization is subscription specific. That is, every organization-level transform is derived from a specific subscription-level transform. This transform allows an organization to specify additional filtering of purchased content. For example, a client may purchase content that includes industry or critical reviews of a product, by may elect to filter out reviews provided by a competitor. The organization-level transform is optional, and may be defaulted in a manner described below.

The presentation-level transform converts an organization-level document into a presentation-level document. The presentation-level customization is organization specific. This transform may generate an HTML document for end user presentation, an attribute/name/value text file for importation into legacy systems, or any number of other customized presentations. The presentation-level transform is optional, and may be defaulted. For purposes of this Description, the presentation-level transform that generates a text file is referred to as the FLAT transformation, and, as suggested, may include attribute/name/value associations.

Although not readily apparent from FIG. 1, the document generation methodology supports the construct of transform defaulting. That is, in the event that a client or customer has expressed a desire to commission a given level transform, but has not yet characterized the nature of the transform, a DEFAULT transform will be created as a placeholder for the level transform that is ultimately to be provided. For example, if it is anticipated that a client will ultimately require and organization-level transform, but such a transform has not yet been, or is not yet capable of being, created, then an aribitrary DEFAULT transform will be interposed. The DEFAULT organization-level transform enable the client to specify a presentation-level transform that enables the creation of a customized presentation-level document based on the default organization-level document.

In a manner that should be apparent from the above, the subscription-level transform controls access to the document content and therefore can not be defaulted. All other transform levels support defaulting. If the specified transform is not present in the document manager (described infra), then the DEFAULT-level transform is used. If there is no DEFAULT transform, then an unmodified copy of the parent document, referred to as a NULL transform, will be generated. If a NULL transform is applied, then the copy must be created to allow for a correct dependency tracking if either the DEFAULT or the specific transform is subsequently provided. If a DEFAULT transform is used to generate a document, the document record must contain a reference to the DEFAULT transform in order to ensure that regeneration of the document occurs if the DEFAULT transform is modified.

Figure 2:
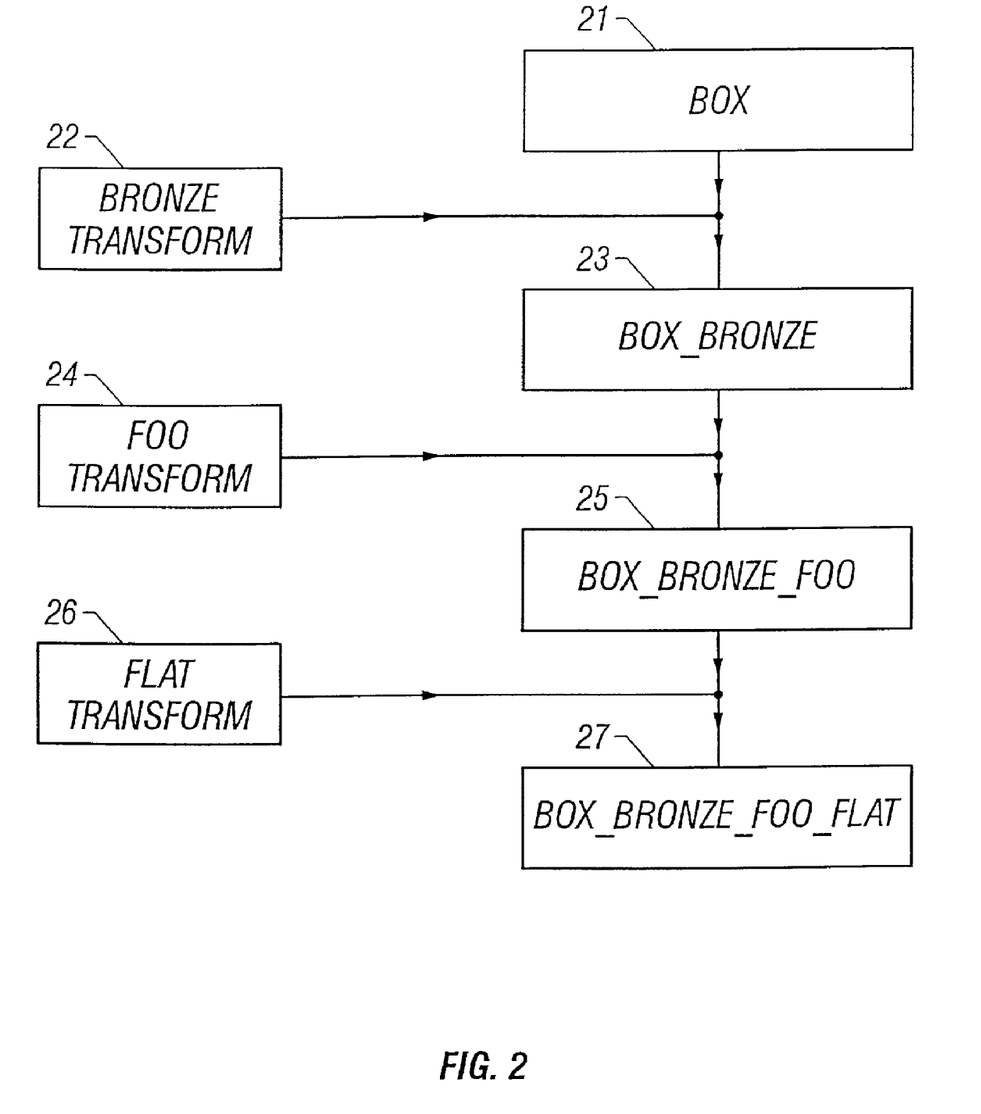
FIG. 2 is a graphical representation of a specific, but hypothetical, raw XML document that is decomposed by the application of a sequence of transforms, in the form of XSL sytlesheets, into subscription-level, organization-level, and presentation-level transforms.

FIG. 2 is a graphical representation in which a specific, by hypothetical, raw XML document 21 is decomposed, by a sequence of transforms, into subscription-level, organization-level, and presentation-level documents. Specifically, a hyphothetical raw document denominated "BOX" is set forth immediately below.

The BOX Document:

```
<DATASHEET>
    <CLASS>box</CLASS>
    <SPECS>
        <HEIGHT>one</HEIGHT>
        <WIDTH>two</WIDTH>
        <LENGTH>three</LENGTH>
```

```
        </SPECS>
        <REVIEWS>
            <REVIEW type="full">This is the full review</REVIEW>
            <REVIEW type="short">A short review</REVIEW>
        </REVIEWS>
</DATASHEET>
```

With continued reference to FIG. 2, application of a BRONZE subscription-level transform 22 to the raw BOX document generates the BOX_BRONZE subscription-level document 23. The BRONZE subscription-level transform and the resulting BOX_BRONZE document are presented immediately below.

The Bronze Subscription Transform:

```
<?xml version="1.0" encoding="ISO-8859-1"?>
<xsl:stylesheet xmlns:xsl=
"http://www.w3.org/1999/XSL/Transform" version="1.0">
    <xsl:output method="xml"encoding="ISO-8859-1"indent="yes"/>
    <xsl:strip-space elements="*"/>
    <xsl:template match="/">
        <xsl:comment>The Bronze subscription removes all full reviews.</xsl:comment>
        <xsl:copy>
            <xsl:apply-templates select="node( )|@*|comment( )|processing-instruction( )" />
        </xsl:copy>
    </xsl:template>
    <xsl:template match="node( )|@*|comment( )|processing-instruction( )">
        <xsl:copy>
            <xsl:apply-templates select="node( )|@*|comment( )|processing-instruction( )" />
        </xsl:copy>
    </xsl:template>
    <xsl:template match="REVIEW[@type='full']" >
        <xsl:comment>The full review has been removed!
        </xsl:comment>
    </xsl:template>
</xsl:stylesheet>
```

The BOX_BRONZE Document:

```
<?xml version="1.0" encoding="ISO-8859-1"?>
<!--The Bronze subscription removes all full reviews.-->
<DATASHEET>
    <CLASS>box</CLASS>
    <SPECS>
        <HEIGHT>one</HEIGHT>
        <WIDTH>two</WIDTH>
        <LENGTH>three</LENGTH>
    </SPECS>
    <REVIEWS>
        <!--The full review has been removed!-->
        <REVIEW type="short">A short review</REVIEW>
    </REVIEWS>
</DATASHEET>
```

Application of the FOO organization transform 24 to the BOX_BRONZE subscription document generates the BOX_BRONZE_FOO organization-level document 25. The FOO organization transform and the BOX_BRONZE_FOO organization document are presented immediately below.

The FOO Organization Transform:

```
<?xml version="1.0" encoding="ISO-8859-1"?>
<xsl:stylesheet xmlns:xsl="http://www.w3.org/1999/XSL/Transform" version="1.0">
    <xsl:output method="xml"encoding="ISO-8859-1" indent="yes"/>
    <xsl:strip-space elements="*"/>
    <xsl:template match="/" >
        <xsl:comment>The FOO organization removes all reviews and renames :WIDTH to :DEPTH.</xsl:comment>
        <xsl:copy>
            <xsl:apply-templates select="node( )|@*|comment( )|processing-instruction( )" />
        </xsl:copy>
    </xsl:template>
    <xsl:template match="node( )|@*|comment( )|processing-instruction( )">
        <xsl:copy>
            <xsl:apply-templates select="node( )|@*|comment( )|processing-instruction( )" />
        </xsl:copy>
    </xsl:template>
    <xsl:template match="REVIEWS" >
        <xsl:comment>All reviews have been removed.</xsl:comment>
    </xsl:template>
    <xsl:template match="WIDTH" >
        <xsl:comment>:WIDTH renamed as :DEPTH.</xsl:comment>
        <DEPTH><xsl:value-of select="." /></DEPTH>
    </xsl:template>
</xsl:stylesheet>
```

The BOX_BRONZE_FOO Document

```
<?xml version="1.0" encoding="ISO-8859-1"?>
<!--The FOO organization removes all reviews and renames :WIDTH to :DEPTH.-->
<!--The Bronze subscription removes all full reviews.-->
<DATASHEET>
    <CLASS>box</CLASS>
    <SPECS>
        <HEIGHT>one</HEIGHT>
        <!--:WIDTH renamed as :DEPTH.-->
        <DEPTH>two</DEPTH>
        <LENGTH>three</LENGTH>
    </SPECS>
    <!--All reviews have been removed.-->
</DATASHEET>
```

Application of the FLAT presentation transform 26 to the BOX_BRONZE_FOO organization document generates the BOX_BRONZE_FOO_FLAT presentation document 27. The FLAT presentation transform and the resulting BOX_BRONZE_FOOFLAT presentation document are presented immediately below.

Figure 3:
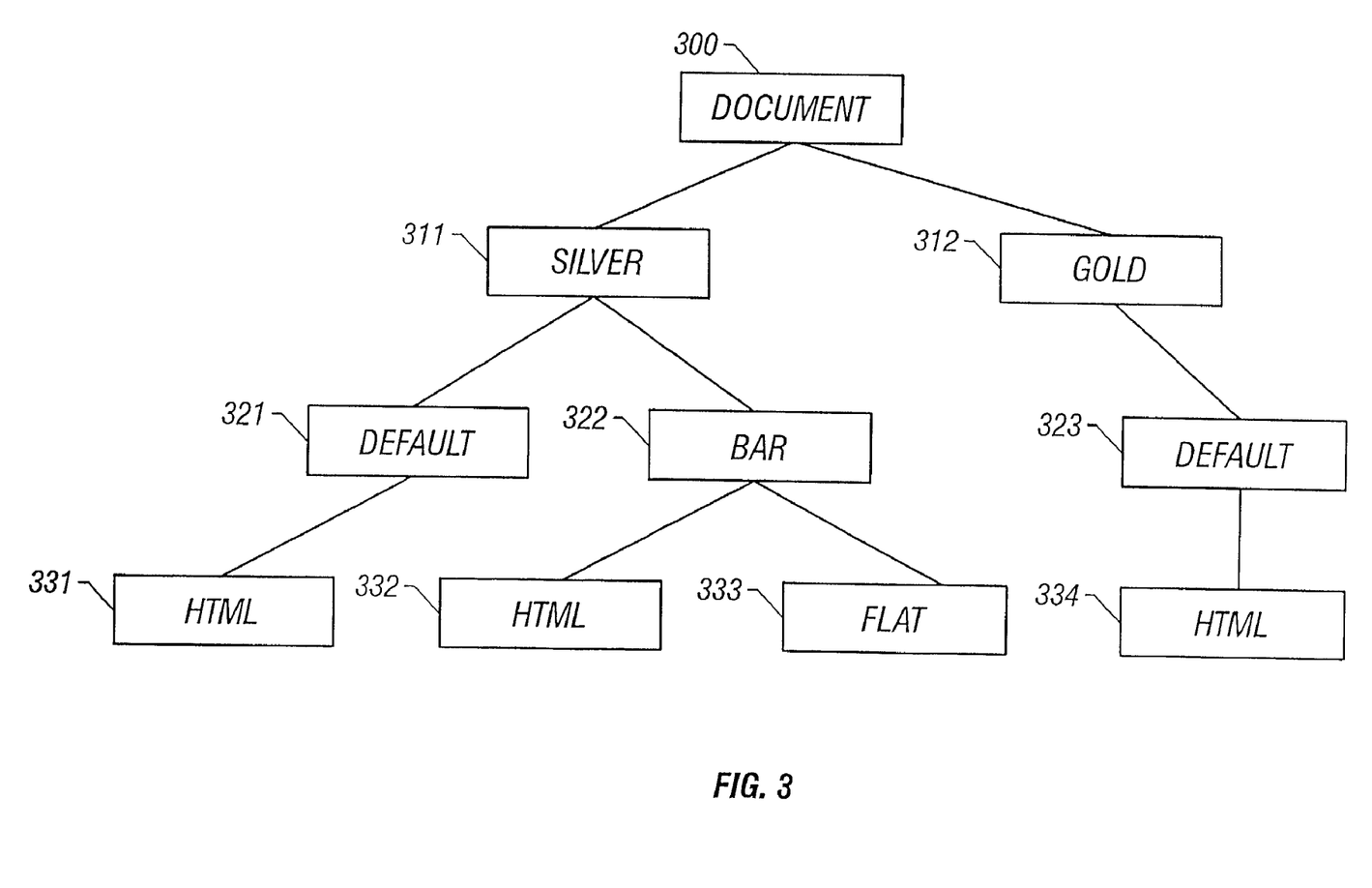
FIG. 3 is a graphical representation of a hierarchical tree structure according to which customized documents are generated.

The FLAT Presentation Transform:

As depicted in FIG. 3, set of all supported sequences of transforms may be mapped to a tree hierarchy, so that, for example, the presentation level represents a leaf node in the tree, the organization level is the parent of the presentation level, and the subscription level is the parent of the organization level. Thus there may be multiple presentations of a single organizations view of subscription level content.

Subscription Node:
SUBSCRIPTION::='SILVER' |'GOLD'
Organization Node:
ORGANIZATION::='DEFAULT' |'BAR'

The ORGANIZATION is a string. An organization level transform is defined with respect to a specific subscription level. Consequently, the same organization name may occur in different subscription levels, and represent potentially different transforms.

Presentation Level Transform:
PRESENTATION::="HTML' |'FLAT'

The PRESENTATION is a string. A presentation may have any number of supported presentations, and presentation is defined with respect to a specific organization. The same presentation name may occur in different organization levels, and represent potentially different transforms.

```
<?xml version="1.0" encoding="ISO-8859-1"?>
<xsl:stylesheet xmlns:xsl="http://www.w3.org/1999/XSL/Transform" version="1.0">
    <xsl:output method="xml"encoding="ISO-8859-1" indent="yes"/>
    <xsl:strip-space elements="*"/>
    <xsl:template match="/" >
        <xsl:comment>The FLAT presentation transform flattens the document structure.</xsl:comment>
        <xsl:copy>
            <xsl:apply-templates select="node( )|@*|comment( )|processing-instruction( )" />
        </xsl:copy>
    </xsl:template>
    <xsl:template match="node( )|@*|comment( )|processing-instruction( )">
        <xsl:copy>
            <xsl:apply-templates select="node( )|@*|comment( )|processing-instruction( )" />
        </xsl:copy>
    <xsl:template>
    <xsl:template match="SPECS" >
        <xsl:comment>Removed the :SPECS level of the document.</xsl:comment>
        <xsl:apply-templates select="node( )|@*|comment( )|processing-instruction( )" />
    </xsl:template>
</xsl:stylesheet>
```

The BOX_BRONZE_FOO_FLAT Document:

```
<?xml version="1.0" encoding="ISO-8859-1"?>
<!--The FLAT presentation transform flattens the document structure.-->
<!--The FOO organization removes all reviews and renames :WIDTH to :DEPTH.-->
<!--The Bronze subscription removes all full reviews.-->
<DATASHEET>
    <CLASS>box</CLASS>
    <!--Removed the :SPECS level of the document.-->
    <HEIGHT>one</HEIGHT>
    <!--:WIDTH renamed as :DEPTH.-->
    <DEPTH>two</DEPTH>
    <LENGTH>three</LENGTH>
    <!--All reviews have been removed.-->
</DATASHEET>
```

FIG. 3 corresponds to a graphical representation of a manner in which an internally represented raw document 30 may be decomposed by sequential application of subscription-level, organization-level, and presentation-level transforms. FIG. 3 illustrates a document that may be optionally transformed into a SILVER subscription-level document 311 or a GOLD subscription-level document 312. Either the SILVER, GOLD, or some other customer-defined organization-level document is mandatory for each customer of the document. In essence, the subscription-level transform enables content filtering that provides customers (subscribers) with a subset of the content that is available in the raw document.

In the hypothetical representation of FIG. 3, the SILVER subscription-level document is decomposed in one branch into a BAR organization-level document 322. The GOLD subscription-level document 312 is illustrated in FIG. 3 to be transformed only into the DEFAULT organization-level document 321. That is to say, there is, in the context of FIG. 3, no demand exists for a customized organization-level transform of document 30. Accordingly, a DEFAULT organization-level transform is generated for the GOLD subscription-level document, as is a DEFAULT organizational-level transform for the SILVER subscription-level document.

Finally, at the presentation-level, both the SILVER_DEFAULT and GOLD_DEFAULT branches are decomposed into HTML presentation-level documents 331 and 334, respectively. The BAR organization-level document is seen to be transformed (decomposed) into both HTML and FLAT presentation-level documents.

In the example depicted in FIG. 3, any request for a transformed document from the GOLD subscription branch will use the DEFAULT organization transform. A document from the SILVER subscription branch will use the DEFAULT organization transform, except for any BAR organization requests. The SILVER-BAR branch is the only organization that provides a FLAT presentation transform. The SILVER-BAR-HTML branch is the only custom HTML presentation transform.

Figure 4:
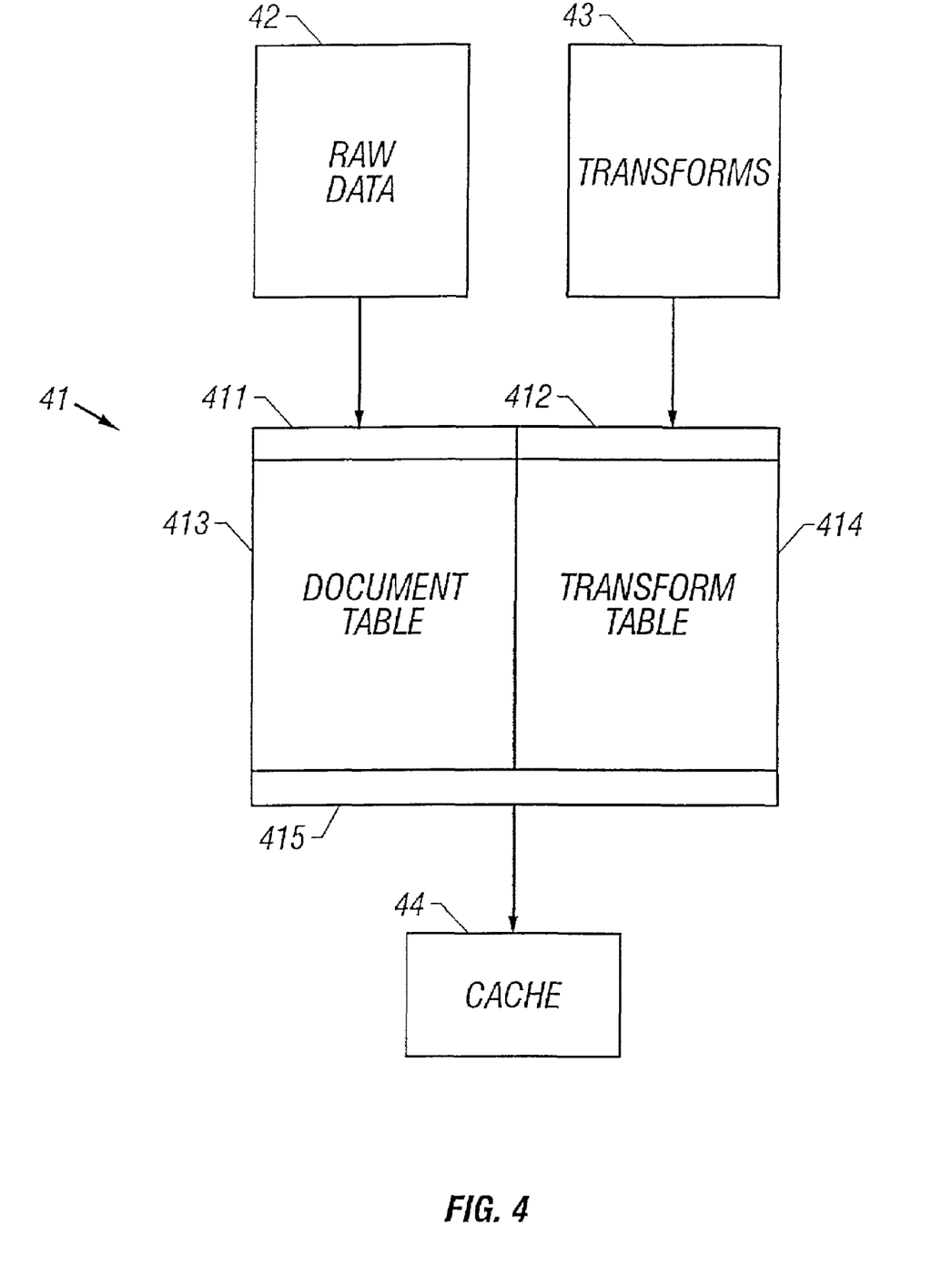
FIG. 4 is a graphical representation of a document generator system that includes a data manager, a document database and a cache for storing customized documents.

FIG. 4 is a graphical representation of a data document generator that is effective to generate, maintain store, and distribute customized data documents in the manner described above. As may be seen in FIG. 4, the data document generator includes a document manager 41 that includes both a document table 413 and a transform table 414. Document table 413 contains rows of document records, 413a, ..., 413n, such as those illustrated and described above, that identify and are used to read raw data documents from the raw data document database 42. Similarly, transform table 414 contains rows of transform records, 414a, ..., 414n, that identify and are used to read transforms from transform database 43. Document manager 411 accesses database 42 through a software interface 411 and accesses transform database 43 through a software interface 412. Customized data documents, when generated in accordance with the operations described above, are written by document manager 41, through a software interface, to cache 44. As has been described above, when an initial request for a customized document received, the document manager reads a data document from database 42, and calls the appropriate transform from database 43. The transform is applied to the raw data document so as to generate the customized subscription, organization or presentation level document, and the requested document is written to cache 44.

The data document generator supports numerous mechanisms for the delivery of customized documents to clients. For example, documents may be transmitted (downloaded) to clients' legacy systems, made available through online access, or may be delivered in bulk via a suitable storage medium, such as paper, magnetic tape, CD-ROM or the like.

In accordance with one embodiment, the raw and generated documents are stored in the document branch of the datasheet manager directory hierarchy. The DOCUMENT hierarchy may be partitioned in any manner. A datasheed manager document table contains the actual pathname of the specified document.

As indicated above, a raw XML document is generated by the publication process and then transformed by the application of a sequence of transforms. A transform may be either an XSL stylesheet or a Java class that parses and transforms its input. A generated document is dependent on its parent document and its level transform. In accordance with the invention, a document is generated recursively by generating the parent document and then applying the appropriate level transform. If the level transform does not exist a copy of the parent document is returned.

There are two potential sources of inconsistency between the document manager and the file system. The first occurs when the database asserts that there exists a valid generated document, but the specified file does not exist. In this case, the solution is simply to regenerate the document. The second source of errors results from an orphaned document in the directory hierarchy. An orphaned document is a document that does not have a corresponding row in the document table. In this instance, the anomaly is resolved through a maintenance process that detects and removes orphaned documents.

A document identifier and a transform sequence uniquely describe any generated document. The transform sequence is a specified sequence of transforms. These parameters will be stored in a document record in the datasheet manager document table. A document record will have an associated global identifier (GID), and the GID will be used to generate a unique pathname for the document in the document hierarchy.

As contemplated in one embodiment of the invention, a document record contains the following fields:
ID
SUBSCRIPTION
ORGANIZATION
PRESENTATION
GID
TIMESTAMP
VALID A transform is uniquely defined by the following set of input parameters: Organization, Subscription, and Presentation. These parameters will be stored in a transform record in the datasheet manager transform table. A transform record will have an associated global identifier (GID), and the GID will be use as to generate a unique pathname for the transform in the transform hierarchy.

A transform record contains the following fields:
SUBSCRIPTION
ORGANIZATION
PRESENTATION
VALID
GID
TIMESTAMP A set of documents may become outdated through any of the following ordered set of operations:
   (i) Publication of new version of the raw XML document.
   (ii) Modification of the Subscription Level Customization.
   (iii) Modification of the Organization Level Customization.
   (iv) Modification of the Presentation Level Customization.

When a raw XML document is published for the first time, a row will be added to the datasheet manager document table. The addition of this now indicates that a document is available for the specified identifier. Using the GID for the actual filename avoids any possible conflict that might arise when a previously generated file is accessed at the same time a fresh file is being published. It is possible that more than one valid version of a document may exist in the datasheet manager. Therefore, whenever a document is requested, the most recent time-stamped valid version is always returned. Stale documents may be deleted from the data store based on the date time stamp. Purging of stale documents is done on a regularly scheduled basis.

An exemplary representation of the initial row entry in the datasheet manager is depicted below. As indicted therein, the product identifier (ID) is indicated as "1234," and the applicable (necessary) subscription-level transform is "AG". No transforms have been ordered at the organization and presentation levels, so a NULL transform is applied at those levels. The document Global Identifier (GID) is "ABC123". The document is date stamped and indicated as VALID.

| ID | Sub. | Org. | Pre. | GID | Date | Valid |
|---|---|---|---|---|---|---|
| 1234 | AG | NULL | NULL | ABC123 | 12:00 | TRUE |

Generation of subscription, organization and presentation-level documents results in the addition of rows to the document table for each transform. If the corresponding level transform does not exist, the level document will be the same as the parent document, and the corresponding level transformed, as indicated above is referred to as the NULL transform.

When a new transform is added, the datasheet manager determines whether there is an existing version of the specified transform. The GID corresponding to the previous version of the transform record may be used to compute the set of dependent documents that must be marked invalid. For example, if the new transform is an organization level transform, and there is no previous version of the organization level transform, then there may be organization level documents that depend from the default organization transform. Default dependency documents must be marked so that any future requests will force a regeneration. The regeneration will use the new organization transform.

| ID | Sub. | Org. | Pre. | GID | Date | Valid |
|---|---|---|---|---|---|---|
| 1234 | AG | NULL | NULL | ABC123 | 12:00 | FALSE |
| 1234 | AG | NULL | NULL | XYZ432 | 12:01 | TRUE |
| 1234 | AG | BAR | NULL | LMNOP | 12:02 | TRUE |
| 1234 | AG | BAR | BAZ | WATFO | 12:03 | TRUE |

Previously generated documents may be rendered stale as a result of any one of four possible events:

(i) Publication of fresh raw XML

When a raw XML document is published and there exists a previous version of the document, a new row for the fresh document is added to the document table. Previously generated documents that depend on the previously published raw XML are indicated as no longer being valid. Typical implementing cone is set forth immediately below.

SET DOC.VALID=false
WHERE ID="1234"

(ii) Modification of the Subscription Transform

The subscription level transform may be modified only by the substitution of a new subscription level transform for the preexisting transform. When a subscription transform is modified, all previously generated documents that depend from the subscription level transform are designated as no longer valid. Further, because the subscription level transform is required, and there is no default, the only legitimate change in the subscription-level transform is substitution, as indicated by the following code:

SET DOC.VALID=false
WHERE DOC.SUBSCRIPTION='AG'

(iii) Modification of the Organization Customization

When and organization level transform is revised all earlier documents that depend on the subscription and the organization are indicated as being invalid. Four types of changes to an organization transform are recognized: changing an existing organization transform, changing an existing organization default transform, adding a new organization transform, and adding a new organization default transform. The corresponding code is illustrated below.

Changing an existing organiztion transform:
SET DOC.VALID=false
WHERE DOC.SUBSCRIPTION.='AG' AND DOC ORGANIZATION='BAR'

Changing an existing organization default transform:
SET DOC.VALID=false
WHERE DOC.TRANSFORM.GID=GID or DOC.PARENT.TRANSFORM.GID=GID Since the default organization transform may be applied to any organization, it is not valid to match on the organization. Furthermore, because a document record contains a reference to both its parent document and its transform, it is possible to select the depending documents by matching on these fields.

Adding a new organization transform:
SET DOC.VALID=false
WHERE DOC.SUBSCRIPTION='AG' AND DOC.PARENT.TRANSFORM=nil These will match on all documents that would have used a default transform if one had been available.

(iv) Modification of the Presentation Customization

There are four types of changes to a presentation transform: changing an existing presentation transform, changing an existing presentation default transform, adding a new presentation transform, and adding a new presentation default transform.

Changing an existing presentation transform:
SET DOC.VALID=false
WHERE DOC.SUBSCRIPTION='AG' AND DOC.ORGANIZATION='BAR' AND DOC.PRESENTATION='HMTL'

Changing an existing presentation default transform:
SET DOC.VALID=false
WHERE DOC.TRANSFORM.GID=GID Adding a new presentation transform:
SET DOC.VALID=false
WHERE DOC.SUBSCRIPTION='AG' AND DOC.ORGANIZATION='BAR' AND DOC.PRESENTATION='HMTL'

Adding a new presentation default transform:
SET DOC.VALID=false
WHERE DOC.SUBSCRIPTION='AG' AND DOC.ORGANIZATION<>nil AND DOC.PRESENTATION='HMTL' AND DOC.TRANSFORM=nil There has been described above a technique, including a process and an enabling system, for generating, maintaining, storing, and distributing customized data documents. The technique comprehends a document-generation process in which a previously compiled raw document is transformed by, for example, XML parser objects, into an internal representation of the document table, facilitates reading a first (subscription-level) transform from a transform database. The first-level transform is applied to the internal representation so as to form a first-level document, which is then written to cache. When a request is received for a second-level document that depends from (is based on) the first-level document, and applicable second-level transform is read from the transform database. The second-level transform is applied to the then-existing first-level document so as to generate the requested second-level document. However, it must be recognized that the above Description is provided primarily as an exemplar that articulates the inventive concept and enables exploitation of that concept. As such, the Description is not to be construed so as to confine the scope of the invention.

For example, a particular attention has been directed to the application of the invention to data documents; but clearly the invention may be applied to other types of information or other content. Nor is implementation of the invention confined to the XML mark-up language or XSL stylesheets. In addition, although three document levels (subscription, organization and presentation) are described, the number and characteristics of the document levels are largely driven by client needs, and is clearly extensible. Similarly, a specific embodiment of a system for generating, storing, maintaining, and distributing data documents is described above and illustrated in FIG. 4. However, those skilled in the art will recognize that the system illustrated in FIG. 4 may be re-architectured and its functions differently partitioned.

Accordingly, although the invention has been described with respect to the specific exemplary embodiment set forth above, the invention is not properly limited to the exemplary embodiment. Various modifications, improvements, and additions may be implemented by those with skill in the art, and such modifications, improvements and additions are to be considered within the scope of the Claims.

What is claimed is:

1. A method of generating customized versions of a document using a computer system, the method comprising:
    storing the document in raw form;
    parsing the document to create an internal representation of the document;
    receiving a request to generate a second-level document;
    decomposing the document to create the second-level document, wherein decomposing the document comprises:
        applying a first first-level transform to the internal representation of the document to create a first first-level document; and
        in response to the request to generate the second-level document, applying a second-level transform to the first first-level document to create the second-level document;
    decomposing the document to create a second first-level document, wherein decomposing the document to create the second first-level document comprises:
        applying a second first-level transform to the internal representation of the document to create a second first-level document;
    tracking changes to at least one of: (i) the raw form of the document, (ii) the first first-level transform, (iii) the second level transform, and (iv) the second first-level transform;
    regenerating the document created using any of (i)-(iv) whose changes are tracked if a change occurs in any of (i)-(iv) whose changes are tracked; and
    designating a previously stored version of the regenerated document invalid;
    wherein the first first-level document and the second first-level document are different.

2. The method as defined in claim 1, wherein applying a first first-level transform and applying a second-level transform comprises applying sequential transforms to the document.

3. The method as defined in claim 1, wherein decomposing the document comprises applying a third-level transform to the second level document to create a third-level document.

4. The method as defined in claim 1, wherein the document is stored in raw XML form.

5. The method as defined in claim 4, wherein applying a first first-level transform and applying a second-level transform comprises applying sequential transforms to the document.

6. The method as defined in claim 5, wherein applying a first first-level transform of the document stored in raw XML form comprises applying a subscription-level transform to the internal representation of the document to create a subscription-level document.

7. The method as defined in claim 6, wherein the subscription-level transform enables content filtering of the internal representation in accordance with a user's request.

8. The method as defined in claim 7, wherein applying a second-level transform comprises applying an organization-level transform to the subscription-level document to create an organization-level document.

9. The method as defined in claim 8, wherein the organization-level transform enables subscription-specific content filtering of a subscription-level document.

10. The method as defined in claim 9, wherein decomposing the document comprises applying a presentation-level transform to the organization-level document to create a presentation-level document.

11. The method as defined in claim 10, wherein the presentation-level transform generates an organization-specific document for end user presentation.

12. The method as defined in claim 11, wherein the presentation-level transform generates an HTML document or a text file for end user presentation.

13. The method as defined in claim 12, wherein the subscription-level transform is mandatory and the organization-level and presentation-level transforms are optional.

14. The method as defined in claim 1, wherein a transform is applied to a document only as a result of an initial demand for a transformed document.

15. The method as defined in claim 14, wherein the demand for a transformed document is a client request.

16. The method as defined in claim 15, wherein the demand for a transformed document is a document publication process.

17. The method as defined in claim 14, wherein transformed documents are written to a cache.

18. The method as defined in claim 17, wherein demands for a transformed document, subsequent to the initial demand, are referred to the cache.

19. The method as defined in claim 1, wherein regenerating the document further comprises:
    regenerating the document created using any of (i)-(iv) whose changes are tracked when any of (i)-(iv) changes.

20. The method as defined in claim 1, wherein regenerating the document further comprises:
    regenerating the document created using any of (i)-(iv) whose changes are tracked in response to a request for the document that is made after the change occurs in any of (i)-(iv) whose changes are tracked.

21. A computer readable medium having code stored therein to cause a data processing system to generate a data document according to a process comprising:
    storing a raw form of the document;
    parsing the document to create an internal representation of the document; and
    receiving a request from a client computer system coupled to the data processing system to generate a second-level document into a particular form;
    decomposing the document into the form requested by the client system, wherein decomposing the document comprises:

applying a first first-level transform to the internal representation of the document to create a first first-level document; and in response to the request to generate the second-level document, applying a second-level transform to the first first-level document to create the second-level document;

decomposing the document to create a second first-level document, wherein decomposing the document to create the second first-level document comprises:

applying a second first-level transform to the internal representation of the document to create a second first-level document;

tracking changes to at least one of: (i) the raw form of the document, (ii) the first first-level transform, (iii) the second level transform, and (iv) the second first-level transform;

regenerating the document created using any of (i)-(iv) whose changes are tracked if a change occurs in any of (i)-(iv) whose changes are tracked; and designating a previously stored version of the regenerated document invalid;

wherein the first first-level document and the second first-level document are different.

22. The computer readable medium as defined in claim 21, wherein applying a first first-level transform and applying a second-level transform comprises applying sequential transforms to the document.

23. The computer readable medium as defined in claim 21, wherein the document is stored in XML form.

24. The computer readable medium as defined in claim 23, wherein the document stored in XML form is parsed by an XML parser to create the internal representation.

25. The computer readable medium as defined in claim 24, wherein the internal representation level of the document is transformed to a subscription-level document by applying a subscription-level transform to the internal representation.

26. The computer readable medium as defined in claim 25, wherein application of the subscription level transform to the internal representation to create a subscription-level document is required.

27. The computer readable medium as defined in claim 25, wherein the subscription-level document is transformed into an organization-level document by applying an organization-level transform to the subscription-level document.

28. The computer readable medium as defined in claim 27, wherein application of the organization-level transform to the subscription-level document to create an organization-level document is optional.

29. The computer readable medium as defined in claim 27, wherein the internal representation of the document is decomposed to a transform-level document only in response to a request for a transform-level document.

30. The computer readable medium as defined in claim 29, wherein transformed documents are written to a cache.

31. The computer readable medium as defined in claim 30, wherein an initial request for a transformed document causes decomposition of the internal representation into the form requested and wherein subsequent requests for a transformed document causes the transformed document to be retrieved from memory.

32. The computer readable medium as defined in claim 21, wherein the code is further configured to cause the data processing system to:

regenerate the document created using any of (i)-(iv) whose changes are tracked when any of (i)-(iv) changes.

33. The computer readable medium as defined in claim 32, wherein the document stored in XML form is parsed by an XML parser to create the internal representation.

34. The computer readable medium as defined in claim 33, wherein the internal representation level of the document is transformed to a subscription-level document by applying a subscription-level transform to the internal representation.

35. The computer readable medium as defined in claim 34, wherein application of the subscription level transformed to the internal representation to create a subscription-level document is required.

36. The computer readable medium as defined in claim 34, wherein the subscription-level document is transformed into an organization-level document by applying an organization-level transform to the subscription-level document.

37. The computer readable medium as defined in claim 36, wherein application of the organization-level transform to the subscription-level document to create an organization-level document is optional.

38. The computer readable medium as defined in claim 36, wherein the internal representation of the document is decomposed to a transform-level document only in response to a request for a transform-level document.

39. The computer readable medium as defined in claim 38, wherein transformed documents are written to a cache.

40. The computer readable medium as defined in claim 21, wherein the code is further configured to cause the data processing system to:

regenerate the document created using any of (i)-(iv) whose changes are tracked in response to a request for the document that is made after the change occurs in any of (i)-(iv) whose changes are tracked.

41. The computer readable medium as defined in claim 40, wherein the document is stored in XML form.

42. A system comprising:

a processor; and a memory, coupled to the processor, having code stored therein to cause the system to generate a data document, wherein the code is executable by the processor for:

storing a raw form of the document;

parsing the document to create an internal representation of the document; and receiving a request from a client computer system coupled to the data processing system to generate a second-level document into a particular form;

decomposing the document into the form requested by the client system, wherein decomposing the document comprises:

applying a first first-level transform to the internal representation of the document to create a first first-level document; and in response to the request to generate the second-level document, applying a second-level transform to the first first-level document to create the second-level document;

decomposing the document to create a second first-level document, wherein decomposing the document to create the second first-level document comprises:

applying a second first-level transform to the internal representation of the document to create a second first-level document;

tracking changes to at least one of: (i) the raw form of the document, (ii) the first first-level transform, (iii) the second level transform, and (iv) the second first-level transform;

regenerating the document created using any of (i)-(iv) whose changes are tracked if a change occurs in any of (i)-(iv) whose changes are tracked; and designating a previously stored version of the regenerated document invalid;

wherein the first first-level document and the second first-level document are different.

43. The system as defined in claim 42, wherein applying a first first-level transform and applying a second-level transform comprises applying sequential transforms to the document.

44. The system as defined in claim 42, wherein the document is stored in XML form.

45. The system as defined in claim 44, wherein the document stored in XML form is parsed by an XML parser to create the internal representation.

46. The system as defined in claim 45, wherein the internal representation level of the document is transformed to a subscription-level document by applying a subscription-level transform to the internal representation.

47. The system as defined in claim 46, wherein application of the subscription level transform to the internal representation to create a subscription-level document is required.

48. The system as defined in claim 46, wherein the subscription-level document is transformed into an organization-level document by applying an organization-level transform to the subscription-level document.

49. The system as defined in claim 48, wherein the internal representation of the document is decomposed to a transform-level document only in response to a request for a transform-level document.

50. The system as defined in claim 49, wherein transformed documents are written to a cache.

51. The system as defined in claim 50, wherein an initial request for a transformed document causes decomposition of the internal representation into the form requested and wherein subsequent requests for a transformed document causes the transformed document to be retrieved from memory.

52. The system as defined in claim 46, wherein application of the organization-level transform to the subscription-level document to create an organization-level document is optional.

53. The system as defined in claim 42, wherein the code is further configured to cause the processor to:

regenerate the document created using any of (i)-(iv) whose changes are tracked when any of (i)-(iv) changes.

54. The system as defined in claim 53, wherein the document stored in XML form is parsed by an XML parser to create the internal representation.

55. The system as defined in claim 54, wherein the internal representation level of the document is transformed to a subscription-level document by applying a subscription-level transform to the internal representation.

56. The system as defined in claim 55, wherein application of the subscription level transformed to the internal representation to create a subscription-level document is required.

57. The system as defined in claim 55, wherein the subscription-level document is transformed into an organization-level document by applying an organization-level transform to the subscription-level document.

58. The system as defined in claim 57, wherein application of the organization-level transform to the subscription-level document to create an organization-level document is optional.

59. The system as defined in claim 57, wherein the internal representation of the document is decomposed to a transform-level document only in response to a request for a transform-level document.

60. The system as defined in claim 59, wherein transformed documents are written to a cache.

61. The system as defined in claim 42, wherein the code is further configured to cause the processor to:

regenerate the document created using any of (i)-(iv) whose changes are tracked in response to a request for the document that is made after the change occurs in any of (i)-(iv) whose changes are tracked.

62. The system as defined in claim 61, wherein the document is stored in XML form.

* * * * *